Dec. 31, 1968  E. P. MOREHOUSE ET AL  3,419,285

TOWING HITCH

Filed May 2, 1967

INVENTORS.
EARL P. MOREHOUSE,
BY MARVIN L. JOHNSON

Schroeder, Siegfried
& Ryan ATTORNEYS

United States Patent Office 3,419,285
Patented Dec. 31, 1968

3,419,285
TOWING HITCH
Earl P. Morehouse and Marvin L. Johnson, both of
Bristol, S. Dak. 57219
Filed May 2, 1967, Ser. No. 635,463
9 Claims. (Cl. 280—446)

ABSTRACT OF THE DISCLOSURE

A towing hitch for mounting on a vehicle bumper on the upper surface of the same so as not to project beyond the profile of the bumper when in a stored position and including a base member attachable to the vehicle frame or bumper and positioned on the upper surface of the bumper and mounting a pair of pivoted towing arm assemblies, each assembly including a universal type pivot member for pivoting the towing arm assembly for horizontal and limited vertical movement. The towing arm assemblies are each formed of a pair of sliding parts, one of which mounts at one extremity of the cooperating coupling member and has an upstanding flange on the opposite extremity of the same. This part is positioned in a channel or box shaped portion on the second part to be slidable therein with the upstanding flange of the first part providing an obstruction which engages the upper surface of the channel portion to limit relative movement between the parts. The free extremity of the second part of the towing arm assembly provides the coupling end of the towing arms. The towing arm assemblies permit relative movement of their parts so that the arms will align, that is shorten or lengthen in a turning movement to provide a positive direction of pull from the towing hitch and proper trailing of the implement being towed.

---

Figure 1:
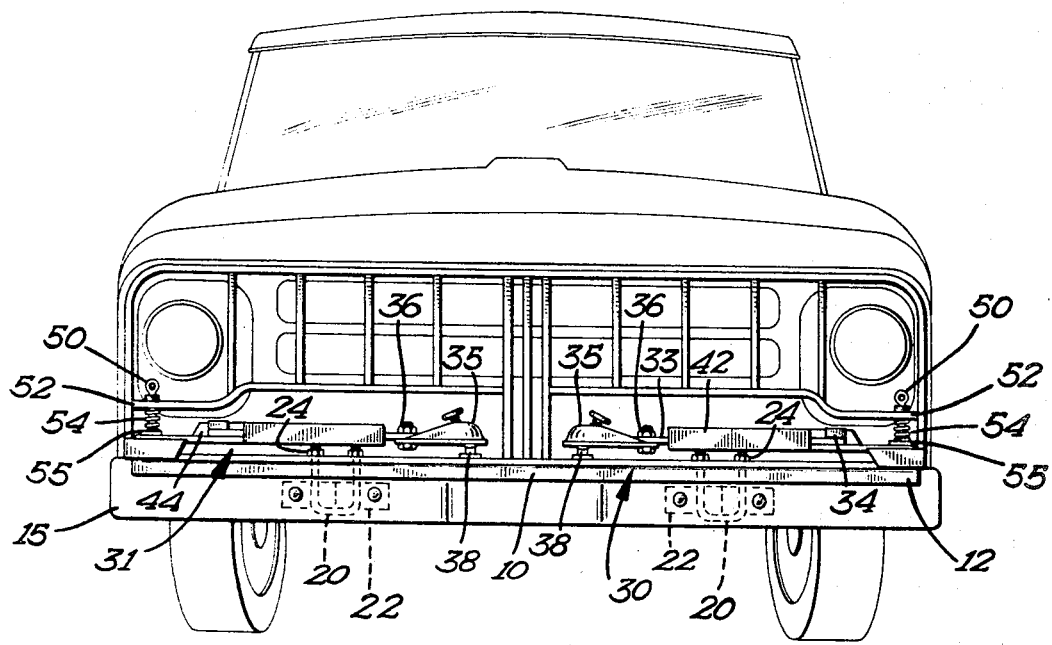

Our invention relates to hitches and more particularly to an improved towing hitch adapted to be mounted on a vehicle in conjunction with the bumper of the same.

Apparatus of this general type is known. The present invention in an improved towing hitch provides a structure which is easy to assemble on a vehicle, is readily storeable to provide no projections from the vehicle and may be readily applied to the front or back bumper of a vehicle. It provides a single bolt type coupling to the implement to be towed and is adjustable to provide for quick alignment with the vehicle to be towed with variations in the arms of the same to provide an alignment with the vehicle in the towing operation and a direct line of pull to increase the strength of the hitch. It may also be readily combined with a grill guard for a front end of a vehicle in conjunction with the bumper. This improved towing hitch includes a base member mounted on the top side of a bumper readily attached to the bumper or vehicle frame. It includes a pair of towing arm assemblies, each of which includes a pair of telescopic parts with one part of each assembly being mounted on the base through a universal type coupling and with the opposite part having a simple aperture therein to provide for a pin type coupling with the vehicle being towed. The arms are made collapsible and retractable within predetermined limits and include a stop therein such that the vehicle will always align with the implement being towed and will provide a direct line of pull therewith. The improved towing hitch includes provision for readily storing the towing arms on the base by pivoting the same in position thereon and securing the same in such a stored position through pins mounted on the base. This improved towing hitch is neat, compact, easily positioned in a storage position for transportation purposes and provides no projection from the outline of the vehicle.

Therefore, it is the principal object of this invention to provide an improved towing hitch.

Another object of this invention is to provide in a towing hitch a structure which is readily coupled to an implement and which does not require accurate positioning of the vehicle for coupling purposes.

Still another object of this invention is to provide a towing hitch which is readily stored on the vehicle without removal therefrom to provide no projection from the vehicle for interference purposes.

Still another object of this invention is to provide a towing hitch of this type which is neat, compact in design, readily positioned in a storage or transporting position.

Another object of this invention is to provide in a towing hitch of this type, adjustable towing arm assemblies which are relatively movable to provide for alignment with the vehicle being towed and direct line of pull therewith.

A further object of this invention is to provide in a towing hitch of this type, a towing hitch which is simple in design, low in cost, easy to install and maintain.

Figure 2:
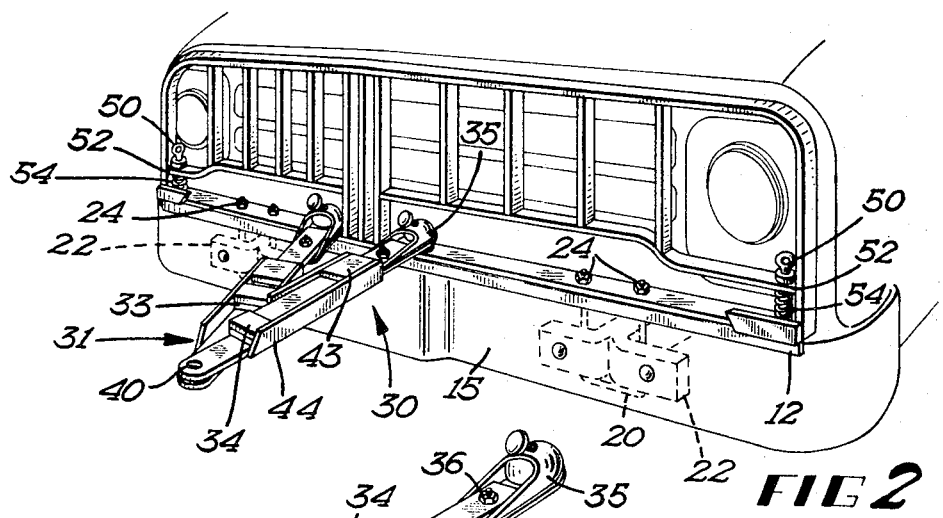
Figure 3:
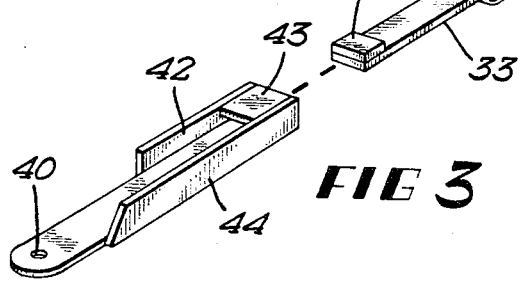

These and other objects of this invention will become apparent from a reading of the attached description together with the drawings wherein:

FIGURE 1 is a plan view of a vehicle including the improved towing hitch in combination with a grill guard, FIGURE 2 is a perspective view of the improved towing hitch, and FIGURE 3 is a perspective view of the parts of a towing arm assembly of the improved towing hitch.

Our improved towing hitch is shown in FIGURES 1 and 2 in conjunction with the bumper on the front end of the vehicle. This improved towing hitch is comprised basically of a base member 10 having a forward flange section 12 projecting over the edge of a vehicle bumper, indicated at 15, with a main extent or portion of the base member disposed flat on top of the bumper. The base member is elongated in form extending across the extent of the bumper or the vehicle and is attached thereto through suitable means such as U bolts indicated in phantom at 20 in FIGURES 1 and 2. These U bolts extend around the bumper braces, also indicated in phantom at 22, or the extension of the vehicle frame to secure the same on top of the bumper. The ends of the bolts are threaded and project through apertures in the base member to be secured thereon through suitable nuts 24. The attachment of the base member to the bumper and vehicle frame may take varying forms.

Positioned on the base member and forming the towing portion of the hitch are a pair of towing arm assemblies indicated generally at 30 and 31, which assemblies are identical in construction. Each is comprised of a pair of parts 33, 44 which fit together in a telescopic fashion and slide relative to one another. The part 33 includes an elongated bar member having an upstanding flange 34 at one extremity and a universal type hitch coupling 35 at the opposite extremity, the hitch coupling being bolted to the bar member through a suitable nut and bolt means 36. The universal hitch coupling 35 mounts on a ball type coupling member 38 secured to the base 10 near the center of the same. The ball type coupling members 38 are spaced from the geometric center of the base member and cooperate with the coupling parts 35 to pivotally mount the towing arm assemblies 30, 31 for horizontal and vertical displacement of the same. The towing assembly part 44 is basically an elongated bar shaped part having an aperture 40 in one extremity of the same in a sleeve-like or channel-like housing 42 extending toward and terminating at the other extremity of the same. The parts 33, 44 are placed in assembled relationship and the flange 34 of the part 33 will engage the top portion 43 of the channel-like housing to effect a stop or limit relative movement of the same. The channel-like housing 42 will also engage the coupling portion 35 as the parts are moved in the opposite direction of relative movement. This construction allows the parts of the towing arm assembly to move relative to one another so that whenever a vehicle is coupled thereto a direct line of pull and proper trailing of the vehicle being towed will be obtained. The towing arm assemblies are placed together at their coupling extremity or the aperture extremity 40 of the same and a suitable pin (not shown) is dropped through the apertures and a cooperating aperture in the coupling on the element to be towed to connect the hitch to the implement. The parts 33, 44 of the arm assemblies 30, 31 will then move relative to one another until the stops 34 of each towing arm assembly engage the channel-like housing of the cooperating parts limiting movement of the same. Whenever turning movement is effected in the towing operation, the arms may shorten to provide for proper alignment and trailing of the hitch with the implement.

To store the hitch for transportation purposes when it is not in use, the respective towing arm assemblies are pivoted to a position where they are disposed on top of the base or frame 10. In this position, a pair of spring biased pin members 50 mounted in an upstanding portion 52 of the base and spring biased through springs 54 will fit through the apertures 40 of the coupling portion of the hitch to secure each towing arm assembly on top of the base frame. The pins 50 have flange parts 55 adjacent the extremity of the same and the springs 54 are positioned between the flanged part and the upstanding portion 52 on the base through which the pin 50 extends to bias the pins in a downward position. They may be released by manually grasping the upper end of the same and applying force against the bias of the compression springs 54 to release the pin extremity of the apertures 40 of the towing arms. This arrangement provides a compact towing hitch design in which the towing arms are folded back away from the bumper and provide no projection forward of the same to interfere with use of the vehicle whenever the hitch is not in towing position.

As shown in FIGURES 1 and 2, the upstanding part 52 of the hitch frame may actually form a grill positioned in front of the vehicle grill as an added protection. This upstanding portion, or the extension of the same to form the grill work, would normally be formed integral with the base or welded thereto and may be omitted if desired.

While we have shown the improved towing hitch positioned on the front end of the vehicle, it will be obvious that this structure may be added to the rear bumper of the vehicle, if desired. In addition, the ball type coupling members may be added with the minimum amount of base member or directly connected to a bumper of additional vehicles and the towing arm assemblies may be utilized with other vehicles to provide the hitch function.

In considering this invention it should be remembered that the present disclosure is intended to be illustrative only and the scope of the invention should be determined by the appended claims.

What is claimed is:
1. A towing hitch, comprising:

(a) base means including structure for fastening the same to the top side of a vehicle bumper;
(b) a pair of tow bar arm assemblies mounted on the base means in spaced relation thereon;
(c) means included in part in the base means and in part in one extremity of each of said arm assemblies for mounting said arm assemblies on said base means for pivotal movement thereon; and
(d) each of said tow bar arm assemblies including a pair of interconnected slidable parts which freely extend and retract to a predetermined length for proper alignment and trailing of the hitch and with a coupling means at the extremity of said part remote from said mounting means.

2. The towing hitch of claim 1 in which the means included in part in the base means is a ball type pivot member and the means in part is the extremity of each arm assembly is a cooperating cupped shaped pivot member.

3. The towing hitch of claim 2 in which the base means is an elongated base member with means for fastening the base member to the top side of a vehicle bumper.

4. The towing hitch of claim 3 and including means on the base member for securing the arm assemblies at the coupling means on the base member such that the arm assemblies are disposed on top of the elongated base member in a stored position.

5. The towing hitch of claim 4 in which the arm assemblies are of equal length and in which the mounting means mounting the arm assemblies for pivotal movement are spaced intermediate the extent of the elongated base member and uniformly from the midpoint thereof.

6. The towing bar hitch of claim 5 in which the slidable parts of the arm assemblies include a first part which has a sleeve portion and a second part which is a straight bar portion positioned within the sleeve and having a flange at the extremity thereof adapted to engage the sleeve and limit the extention of the slidable parts.

7. A towing hitch of claim 6 in which the coupling means at the extremities of one part of said arm assembly is of aperture positioned therein.

8. The towing hitch of claim 7 in which the means on the base member securing the arm assemblies include a slidable pin spring biased to a predetermined position and adapted to fit through the aperture in the end of the part to retain the arm assembly in position on the elongated base member.

9. The towing hitch of claim 8 in which the base member is an elongated plate with upstanding grill work thereon adapted to fit above and in front of the bumper assembly of a car.

References Cited

UNITED STATES PATENTS

| | | | |
|---|---|---|---|
| 2,139,970 | 12/1938 | Moore | 280—491 |
| 2,522,793 | 9/1950 | Koeckritz | 280—491 X |
| 2,658,770 | 11/1953 | Koenig | 280—491 X |
| 2,995,386 | 8/1961 | Peterson | 280—491 |
| 3,147,027 | 9/1964 | Bronleewe | 280—491 |
| 3,281,163 | 10/1966 | Wiebe | 280—491 |

LEO FRIAGLIA, *Primary Examiner.*

U.S. Cl. X.R.

280—478, 491; 293—69